E. L. KINYOUN & A. A. ARMOUR.
QUADRUPLE LACED WIRE WHEEL.
APPLICATION FILED NOV. 10, 1917.
1,281,789.
Patented Oct. 15, 1918.
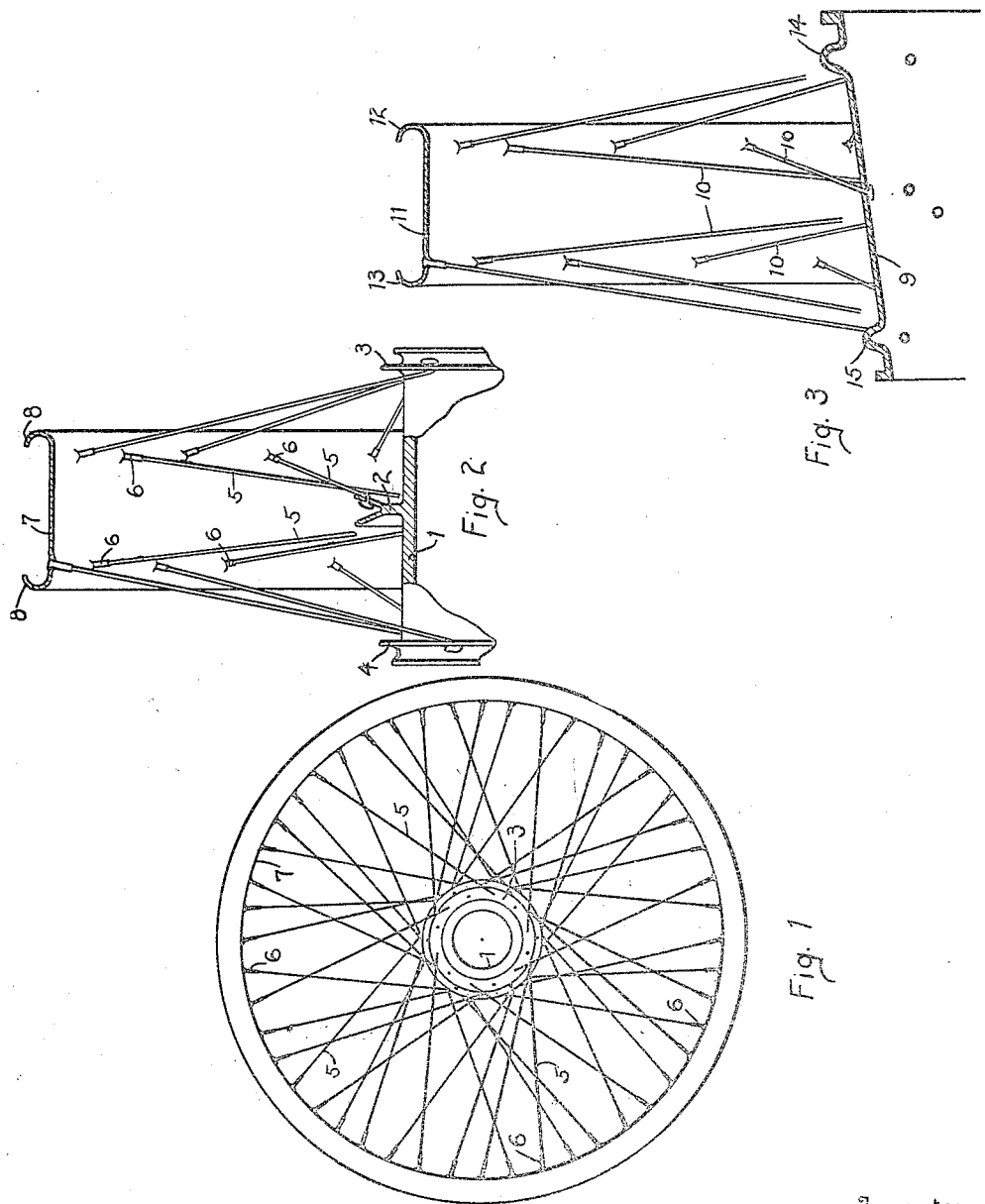

UNITED STATES PATENT OFFICE.

EARL L. KINYOUN AND ANGUS A. ARMOUR, OF DAYTON, OHIO.

QUADRUPLE-LACED WIRE WHEEL.

1,281,789.

Specification of Letters Patent.     Patented Oct. 15, 1918.

Application filed November 10, 1917. Serial No. 201,236.

*To all whom it may concern:*

Be it known that we, EARL L. KINYOUN and ANGUS A. ARMOUR, citizens of the United States, residing at Dayton, in the county of Montgomery and State of Ohio, have invented certain new and useful Improvements in Quadruple-Laced Wire Wheels, of which the following is a specification.

This invention relates to new and useful improvements in quadruple laced wire wheels.

The principal object of our invention is to provide an efficient, cheaply constructed and durable wire wheel which comprises one hub, one rim and but three flanges, with wire spokes running from each of the latter in equal number to solidly lace the rim and hub together and equally divide the weight between the three flanges on the latter.

Another object of our invention is to provide a wire wheel adapted to receive a clencher or a solid tire without any change in the rim.

Another object of our invention is to provide a wire wheel whose hub is a single unit so constructed as to be strong, and yet so light as not to add much weight to an automobile or aeroplane equipped with our improved wheels.

Another object of our invention is to strengthen the wheel against side thrusts by connecting all spokes to the rim in two lines thereon, each close to the outside edge thereof, with no holes in the central part of the rim to release the nipples of the spokes as is often the case when a rim so connected is given a violent side thrust.

Another object of our invention is to provide a wire wheel especially adapted to take care of side strains when an aeroplane is landing or an automobile is skidding, by so constructing it that the spokes cross at different angles and are laced into the rim in alinement with each other at each side thereof and at equal distances apart to divide those strains.

A further object of the invention is to reduce the weight of the wheel for aeroplane or automobile service, without sacrificing its strength, by lacing all the middle spokes of the wheel to one central flange or point in the hub.

Other important and incidental objects will be brought out in the following specification and particularly set forth in the subjoined claim.

The preferred form of embodiment of our invention is illustrated in the accompanying drawings, of which Figure 1 is a side elevation of one of our quadruple laced wire wheels especially adapted for aeroplane use. Fig. 2 is an end elevation thereof, partly in section. And Fig. 3 is an end elevation partly in section, of one of our quadruple laced wire wheels constructed for use on an automobile.

Throughout the specification and drawings, similar reference characters denote corresponding parts.

In a detailed description of the preferred form of embodiment of our invention, reference will first be made to Figs. 1 and 2 showing our improved wire wheel as constructed for aeroplane service. In those figures the numeral 1 designates a one-piece hub having a central annular flange 2 preferably Y shape in cross section, and two outside flanges 3 and 4 respectively. One advantage of making the hub in one piece is to impart strength to it, since those hubs that are made in two parts are subject to a side motion which causes the hub to wear and not fit together properly. Furthermore, a single piece hub is a much lighter hub, thereby materially reducing the weight of the wheel, which is quite an important factor when the latter is used on an aeroplane.

Suitably secured to each outwardly extending portion of the Y flange 2 is an equal number of wire spokes 5. These spokes carry on their outer ends nipples 6 which fit into holes arranged as follows in a tire-receiving rim 7 whose annular edges 8 8 are preferably hook-shaped in cross section as shown in Fig. 2. The spokes 5 connected to the right outwardly extending portion of the Y flange 2, are connected, in alinement with each other, to the rim 7 on a line near its right edge 8. The spokes 5 connected to the left outwardly extending portion of the Y flange 2, are connected in alinement with each other, to the rim 7 on a line near its left edge 8. (See Fig. 2.)

Spokes 5 are also connected, in equal number, to each of the outside flanges 3 and 4 of the hub 1. From the outside flange 3 the spokes 5 extend, and are secured, to the rim 7 between, and on the same line as, the spokes which are connected to the outwardly extending portion of the Y flange 2 which is nearest the flange 3. On the opposite side of the hub, those spokes 5 that are connected to its outside flange 4, are secured to the rim 7 between, and on the same line as, the spokes which are laced to the outwardly extending portion of the Y flange 2 which is nearest the flange 4.

When laced into the rim 7, the spokes 5 are at an equal distance apart on their respective lines, although they run thereto at different angles. This feature of construction divides the strains to which the wheel is subjected. This method of lacing eliminates the side twist to which a wheel is subjected when an aeroplane is landing or an automobile is skidding. Furthermore, the spokes so lace into the rim that the wheel will not give on a side thrust to stretch or loosen the spokes, thereby causing them to wear, larger the holes into which they fit in the hub to make the wheel useless by putting it out of true.

It will also be observed that the Y flange 2 is directly in line with the center of the rim 7; therefore the rim is equally supported to take care of side strains. The spokes from the Y flange run to each edge of the rim, thereby holding the latter over the central portion of the hub. The spokes secured to the outside flanges hold the wheel upright and assist the middle spokes in taking up the strains on a side thrust.

Furthermore, in our improved wire wheel no holes are punched in the central portion of the rim to cause the latter to give and release the nipples of the spokes when the wheel is given a violent side thrust, as is frequently the case with wheels having rims so punched. There are no holes in the rim to weaken it, except those provided along its side edges to receive the spokes before described; and these holes are formed and arranged to conserve the strength of the wheel.

Referring now to Fig. 3, there is shown one of our improved wire wheels especially constructed for automobile service. In this figure the numeral 9 designates a hub shell into the central part of which the n idle spokes 10 are laced, for the same reason that the middle spokes 5 are laced to the Y flange 2 in the aeroplane wheel. O  half of these middle spokes 10 are laced into a tire-receiving rim 11 in alinement with each other near one side edge 12 thereof, while the other half is so secured to said rim near its opposite side edge 13.

Wire spokes 10 also run from the rim 11 to flanges 14 and 15, one on each side of the hub shell 9. For the reasons heretofore given, which apply to an automobile as well as an aeroplane wheel, the outer ends of the middle and side spokes are laced into their respective sides of the rim 11 at equal distances apart and in alinement with each other. Furthermore, there are no holes in the central portion of the rim, which is also directly above the middle of the hub shell. In other words, as in the aeroplane wheel the point of connection of the middle spokes 10 with the hub shell 9, is directly in line with the center of the outside rim, to take up side strains due to skidding and other causes. An equal number of spokes run out from each line of lacing around the hub shell 9, with all spokes crossing at different angles to divide the strains.

It will now be seen that the small number of parts employed in our improved wire wheel, makes it cheap to manufacture, and light in weight without sacrificing its strength. Furthermore, side strains or thrusts are taken up by having the middle spokes run out from the Y flange in the aeroplane wheel, and a central point in the hub shell of the automobile wheel. These features, taken in connection with the others before described, give a wire wheel which is especially adapted for aeroplane and automobile usage.

We do not wish to be limited to the details of construction and arrangement herein shown and described, and any changes or modifications may be made therein within the scope of the subjoined claim.

Having described our invention, we claim:

In a device of the type specified, the combination with a tire-receiving rim, of a single hub having two outside flanges, a central flange Y shaped in cross section on said hub, an equal number of wire spokes extending from each outside flange to its respective side of said rim near the edge thereof, the middle portion of said rim being free of spoke connections and directly over the Y flange, and an equal number of wire spokes extending from each outwardly projecting portion of the Y flange to each side of said rim, for connection thereto in alinement with the first named spokes and at equal distances therefrom, each spoke crossing two others to divide the strains.

In testimony whereof we have hereunto set our hands this 8th day of November, 1917.

EARL L. KINYOUN.
ANGUS A. ARMOUR.

Witness:
HOWARD S. SMITH.